No. 12,351. REISSUED MAY 23, 1905.

W. G. CROSTHWAITE, SURVIVING INVENTOR & T. WESTERBY, DEC'D.

BOILER OR OTHER FURNACE GRATE.

APPLICATION FILED FEB. 13, 1905.

2 SHEETS—SHEET 1.

Fig. 1.

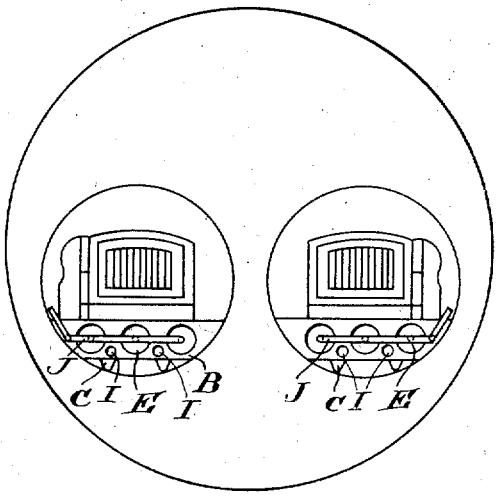

Fig. 4.

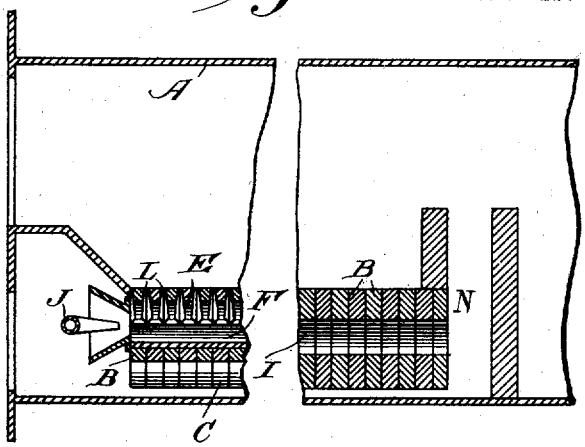

Witnesses
Gertrude M. Studer
C. G. Heyman

Thomas Westerby
Walter G. Crosthwaite
Inventors
Crosthwaite Fire Bar Syndicate, Ltd.
Assignees
by J. Sauvelle Meyers
Attorney

PHOTO-LITHOGRAPHED BY SACKETT & WILHELMS LITHO. & PTG. CO. NEW YORK.

No. 12,351. REISSUED MAY 23, 1905.

W. G. CROSTHWAITE, SURVIVING INVENTOR & T. WESTERBY, DEC'D.

BOILER OR OTHER FURNACE GRATE.

APPLICATION FILED FEB. 13, 1905.

2 SHEETS—SHEET 2.

Fig. 2.

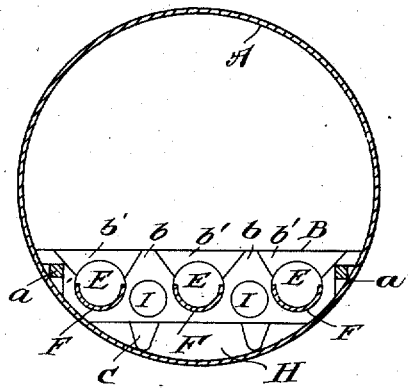

Fig. 7.

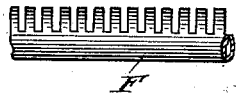

Fig. 5.

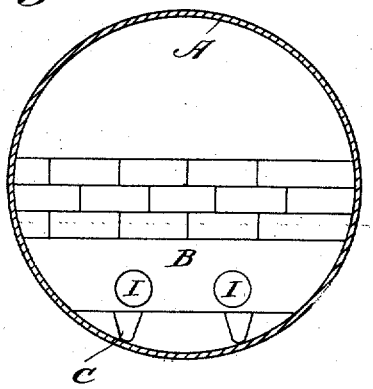

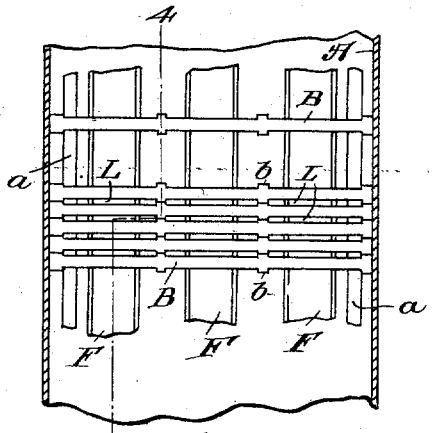

Fig. 6.

Fig. 3.

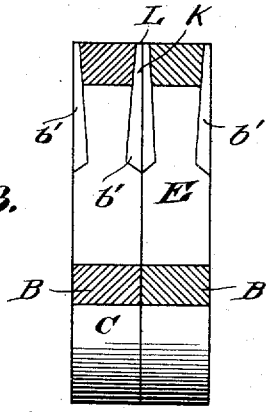

Witnesses
Gertrude M. Stucker
C. Heyman

Thomas Westerby
Walter G. Crosthwaite
Inventors

Crosthwaite Fire Bar Syndicate Ltd
(Company)
by J. Granville Meyers
Attorney

PHOTO-LITHOGRAPHED BY SACKETT & WILHELMS LITHO. & PTG. CO. NEW YORK.

No. 12,351. Reissued May 23, 1905.

UNITED STATES PATENT OFFICE.

WALTER GEORGE CROSTHWAITE, SURVIVING INVENTOR, AND THE CROSTHWAITE FIRE-BAR SYNDICATE, LTD., OF LEEDS, ENGLAND, ASSIGNEE, BY MESNE ASSIGNMENTS, OF THOMAS WESTERBY, DECEASED, AND SAID WALTER GEORGE CROSTHWAITE.

BOILER OR OTHER FURNACE GRATE.

SPECIFICATION forming part of Reissued Letters Patent No. 12,351, dated May 23, 1905.

Original No. 693,634, dated February 18, 1902. Application for reissue filed February 13, 1905. Serial No. 245,556.

*To all whom it may concern:*

Be it known that we, THOMAS WESTERBY, deceased, late a subject of the King of Great Britain, lately residing in Leeds, and WALTER GEORGE CROSTHWAITE, a subject of the King of Great Britain, residing in Leeds, York county, England, (whose present post-office address is York Street Mills, York street, Leeds, England,) have invented certain new and useful Improvements in Boiler or Other Furnace Grates, of which the following is a specification.

This invention has for its object a furnace-grate so constructed of fire-bars as to constitute not only a grate for the fire, but also provide air-conduits for conveying forced or natural draft to the burning fuel and also forced or natural draft to the bridge for smoke consumption by separate passages, all formed in the bars themselves.

The invention will be understood from the following description, reference being had to the accompanying drawings, in which—

Figure 1 is an end view of a Lancashire boiler fitted with our invention; Fig. 2, an enlarged view showing a bar in position; Fig. 3, a cross-section through two of the bars; Fig. 4, a fragmentary longitudinal section through the holes E and I, respectively, said section being taken on the broken line 4 4 of Fig. 6; Fig. 5, a vertical section through the air-chamber at bridge looking toward the front of the furnace; Fig. 6, a top plan showing several of the bars in position, the furnace-flue being shown in section; and Fig. 7, a detail view of an air-tube with grids.

Referring to the figures, the furnace-grate is formed of fire-bars B. (Shown more particularly in Figs. 2 and 3.) These bars are supported on bearers *a* and have feet C, upon which they rest on the bottom of the furnace-flue A, and are formed with holes E, which when the bars are placed side by side in the flue constitute passages for the air-blast. The bars abut against each other at their surfaces *b*, but at *b'* have fan-shaped recesses communicating directly with the passages E, so as to deliver a blast from the passages E in a fan-shaped current into the fire, the flat abutting faces *b* preventing any escape of air below. The fan-shaped recesses *b'* are inclined or formed wedge-shaped, leaving channels K between the bars, which gradually narrow toward the top and finally terminate in narrow openings L in the surface of the grate. It will be seen that the uprising air enters the channels where there is a large area, and by reason of the channels gradually contracting in area toward the narrow openings L the air is caused to rush through the openings with great force, and this rush of air through the grid tends to keep the grid cool.

In order to avoid any possibility of air leaking out between the bars at their abutting faces *b* should said faces be cast not quite true, we can provide semicircular troughs F, passed through the holes E. These tubes insure the blast being delivered upward through the fan-shaped passages exclusively. If preferred, complete tubes with grids cut therein so as to register with the fan-shaped passages *b'* of the bars may be passed into the holes, as shown in Fig. 7. The result in any case is that the blast of air being delivered in a fan-shaped current causes the heat to impinge against the top of the furnace-flue and produce a fire of great heat and uniform intensity. Further, this fan-shaped air-current through the bars ventilates the grate and keeps it from getting as hot as would otherwise be the case; also, no clinker will adhere to the bars. The air-space H, also below the bars, helps to keep the grate cool. I represents separate air-passages in the bars so arranged as to deliver forced or natural draft at will into the air-chamber N at the bridge. J indicates the steam-jets at the entrance to the air-passages for inducing the forced draft. The holes E are closed at end of grate, so as not to deliver air to the bridge.

The mode of action is as follows: The fuel is thrown on the grate either by hand or mechanical stoker, and the air besides being delivered out beyond the bridge by the passages I for smoke consumption is also delivered in fan-shaped currents all over the grate-surface with a vertically-upward motion through the grate, which, being well ventilated, will be found to not get so hot as would otherwise be the case, and the adhering of the clinker is entirely prevented. The air rises through the fuel vertically, and the flame strikes directly upward, or nearly so, forming an intense flame bearing right against the crown of the furnace, passing over the bridge with a considerable amount of carbon unconsumed. This flame meets the hot air issuing through the bridge, and the remaining carbon, hydrogen, and other combustibles are at once consumed. The attendant in charge of the furnace can at any moment increase or decrease the forced air-current by regulating the steam-jets J, and thus the draft can be controlled to a nicety. The grate is well suited for burning small coal, coal-dust, sawdust, and rubbish and applied to destructors and marine boilers is unequaled for economy and efficiency.

By referring to Fig. 5 of the drawings, it will be noted that only the two passages I are seen, the conduits or holes E not appearing. This is due to the fact that the last bar of the series, or that bar next the bridge, is not provided with holes E, as is the case with the other bars, but is imperforate, except for the passages I. This last bar of the series thus serves to close the conduits E at the end of the series, which compels all the air fed into said conduits to pass upward through the upwardly-extending passages into the furnace.

We declare that what is claimed is—

1. The furnace-grate consisting of a series of fire-bars placed close together side by side, and having transverse registering apertures which form air-conduits extending from front to rear of the furnace, and having also upwardly-expanding air-passages extending from said conduits and formed by recesses in the contiguous sides of the bars, whereby the air can freely reach the fuel along practically the entire length of the bars, substantially as described.

2. A furnace-grate having fire-bars transverse to the axis of the furnace, said fire-bars having air-conduits parallel to the axis of the furnace and pierced through them for conveying forced or natural draft, said fire-bars having fan-shaped recesses in their sides at intervals communicating directly with the aforesaid air-conduits whereby the air may be forced through the bars, abstracting heat therefrom, and caused to rise up between the bars into the furnace, substantially as described.

3. In furnace-grates, fire-bars each having conduits registering with those in the next bar, said conduits passing transversely through the bar at a point where the bar is at its fullest width, each bar touching the next at this point but having a portion cut away immediately above such conduits, leaving spaces between the bars of fantail-like form, the broadest part of each space being at the orifice on the surface of the bars and the narrowest at the conduit.

4. In furnace-grates, fire-bars transverse to the axis of the furnace provided with air-conduits pierced through the bars successively in a direction parallel with the axis of the furnace, said conduits registering with each other when in place, and forming when the bars are in place a passage for forced or other draft, said fire-bars being provided with fan-shaped spaces between them opening to these conduits, while closed to the ash-pit, such spaces being wider in the direction of the axis of the furnace at the conduits and gradually narrowing as they approach the fuel-surface of the bars, but at the same time widening out rapidly in a plane at right angles to the axis of the conduit whereby the spaces through which ashes can fall at the fuel-surface of the bars are very narrow, while their entire area is approximately equal to the much broader openings into the conduits.

5. In a furnace, a grate consisting of a series of transverse fire-bars having conduits extending from front to rear of the grate, and spaces in the sides of the bars open from the fuel-surface to some of these conduits, but closed below whereby the air is prevented from entering the ash-pit but may pass up freely through the narrow spaces between the bars into the furnace, and openings leading from other conduits into the bridge whereby the forced draft of the conduits may be supplied both to the furnace and to the bridge while the ash-pit remains open.

6. In a furnace, a grate consisting of a series of grate-bars having conduits extending from front to rear of the grate and spaces in the sides of the bars open from the fuel-surface to these conduits but closed below, whereby the air is prevented from entering the ash-pit but goes up freely through the narrow spaces between the bars into the furnace.

7. A furnace-grate consisting of a series of fire-bars arranged side by side and having their contiguous faces in surface contact, said bars being provided with registering apertures which form air-conduits extending from front to rear of the furnace, and having also upwardly-extending air-passages leading from said conduits and discharging at the surface of the bars, said air-passages being formed by recesses in the contiguous sides of the bars.

8. A furnace-grate consisting of a series of fire-bars arranged side by side, said bars being provided with registering apertures which form air-conduits from end to end of the grate, and recesses in the opposite sides of the bars extending from the air-conduits upward to the fuel-surface but closed below, whereby air is prevented from entering the ash-pit, but is permitted to pass freely through the passages formed by the said recesses and enter the fire-pot.

9. A furnace-grate consisting of a series of fire-bars arranged side by side and having their contiguous faces throughout their length and for a portion of their depth in surface contact, said bars being provided with transverse registering apertures which form air-conduits from end to end of the grate, and recesses in the sides of the bars extending from the air-conduits upward to the fuel-surface but closed below, whereby the air fed into said conduits is prevented from entering the ash-pit, but is permitted to pass freely through the said recesses into the fire-pot.

10. A furnace-grate consisting of a series of fire-bars arranged side by side and having transverse apertures which form air-conduits from end to end of the grate, said bars being provided with upwardly-extending air-passages leading from the air-conduits to the fuel-surface but closed below, whereby air fed into said conduits is prevented from entering the ash-pit but may pass freely upward to the fuel-surface.

11. A fire-bar cast solid with transverse apertures therethrough, and recesses in the opposite sides of the bar extending from said apertures upward to the upper surface of the bar.

12. A solid fire-bar having transverse apertures therethrough and recesses in the opposite sides of the bar extending upward from said apertures to the surface of the bar, the said bar below said apertures being of uniform thickness throughout its length.

In testimony whereof we have hereunto set our hands in presence of two subscribing witnesses.

WALTER GEORGE CROSTHWAITE.
[L. S.] WILLIAM ARTHUR THORNTON,
*Pres. Crosthwaite Fire-Bar Syndicate, Ltd.*

Witnesses:
W. FAIRBURN-HART,
JOSEPH HENRY WHITAKER.